(12) United States Patent
Parsons et al.

(10) Patent No.: US 7,772,492 B2
(45) Date of Patent: Aug. 10, 2010

(54) ANTI-MICROBIAL/ANTI-FUNGAL PLASTIC JACKETED/INSULATED ELECTRIC POWER CORDS

(75) Inventors: Walter Brian Parsons, Weatherford, TX (US); Jimmy Dale Hunter, Keller, TX (US)

(73) Assignee: Southwire Company, Carrollton, GA (US)

( * ) Notice: Subject to any disclaimer, the term of this patent is extended or adjusted under 35 U.S.C. 154(b) by 37 days.

(21) Appl. No.: 11/876,924

(22) Filed: Oct. 23, 2007

(65) Prior Publication Data

US 2009/0101387 A1 Apr. 23, 2009

(51) Int. Cl.
*H01B 7/00* (2006.01)

(52) U.S. Cl. .............................. 174/110 R; 174/113 R

(58) Field of Classification Search ............. 174/110 R, 174/113 R, 110 AR, 110 SR, 110 FC, 110 V, 174/120 R, 120 C, 120 AR, 12
See application file for complete search history.

(56) References Cited

U.S. PATENT DOCUMENTS

| | | | | |
|---|---|---|---|---|
| 3,755,224 | A * | 8/1973 | Lutz, Jr. ........................ | 523/122 |
| 3,800,065 | A * | 3/1974 | Bunish et al. ................ | 174/115 |
| 4,018,962 | A * | 4/1977 | Pedlow ........................ | 442/138 |
| 4,018,983 | A * | 4/1977 | Pedlow ........................ | 174/135 |
| 4,467,138 | A * | 8/1984 | Brorein ........................ | 174/115 |
| 4,818,438 | A * | 4/1989 | Wiley .......................... | 252/511 |
| 5,002,768 | A * | 3/1991 | Kondo et al. ................ | 424/408 |
| 5,043,280 | A | 8/1991 | Fischer et al. | |
| 5,180,890 | A * | 1/1993 | Pendergrass et al. ...... | 174/117 F |
| 5,238,749 | A | 8/1993 | Cueman et al. | |
| 5,478,563 | A | 12/1995 | Erami | |
| 5,698,229 | A | 12/1997 | Ohsumi et al. | |
| 5,817,325 | A | 10/1998 | Sawan et al. | |
| 5,844,021 | A * | 12/1998 | Koblitz et al. ............... | 523/173 |
| 5,885,603 | A | 3/1999 | Fowler et al. | |
| 5,906,825 | A | 5/1999 | Seabrook, Jr. et al. | |
| 6,015,613 | A | 1/2000 | Kinlen et al. | |
| 6,213,995 | B1 | 4/2001 | Steen et al. | |
| 6,485,735 | B1 | 11/2002 | Steen et al. .................. | 424/423 |
| 6,800,065 | B2 * | 10/2004 | Duane et al. ............. | 604/96.01 |
| 2002/0053460 | A1* | 5/2002 | Takeda et al. ............ | 174/117 F |
| 2004/0106732 | A1* | 6/2004 | Tsuji et al. .................... | 525/94 |
| 2004/0168820 | A1* | 9/2004 | Kanamori et al. ........ | 174/110 R |

FOREIGN PATENT DOCUMENTS

| JP | 11-49911 A | * | 11/1988 |
|---|---|---|---|
| JP | 63-289719 A | * | 11/1988 |
| JP | 11-199732 A | * | 7/1999 |

OTHER PUBLICATIONS

Walter Brian Parsons, "Declaration of Walter Brian Parsons", Dec. 17, 2009, pp. 1-2.
"Method 508.5: Fungus", MIL-STD-810F, Jan. 1, 2000, pp. 1-12.

* cited by examiner

*Primary Examiner*—William H Mayo, III
(74) *Attorney, Agent, or Firm*—Merchant & Gould

(57) ABSTRACT

Unitary multiple conductor electrical cables, such as electrical power cords, are disclosed. Multiple conductor electrical cables are insulated with one or more layers of a thermoplastic polymer composition. The outer layer of the thermoplastic polymer composition contains an anti-microbial agent that resists biological contamination.

18 Claims, 1 Drawing Sheet

ANTI-MICROBIAL/ANTI-FUNGAL PLASTIC JACKETED/INSULATED ELECTRIC POWER CORDS

FIELD OF THE INVENTION

The invention relates to plastic insulated or encased multiple conductor electric power cord and cable and more particularly to multiple conductor plastic insulated or jacketed metal wiring or electric power supply cord; that are exposed to the ambient environment of use and in which the plastic contamination resistant characteristics such as, anti-microbial and anti-fungal properties render the wire or cord especially useful for applications that require maintenance of sanitary conditions, such as, pharmaceutical preparation facilities, food services, hospitals and other medical and dental facilities, sanitary fluid handling applications, and the like.

The invention is concerned with the provision of electrical conductor cords that resist biological contamination that may be present or develop in an environment in which the cord is being used and affords a safeguard against the development of infectious germs such as, fungal and microbe growth. The coated electrical transmission power cord fulfills a need for a cable product which can be used in hostile and bacteria-laden environments such as: food supply services, pharmaceutical, medical related applications and water and other liquid purification systems. The coated metal substrate has enhanced chemical and corrosion resistance, which affords protection against formative contamination of biological growth under a variety of harsh and/or hostile environments, and also has the capability of inhibiting the transmission of and proliferation of germs.

BACKGROUND OF THE INVENTION

The widespread threat of micro-organism infestation such as, bacterial contamination and fungal growth and the adverse impact on health has made preservatives a regular part of drug and food processing and packaging. However, the introductions of preservatives often times introduce or generate undesirable side effects, especially for example, in pharmaceutical and food processing applications. Growing consumer awareness concerning the deleterious effect of preservatives has made it paramount that additives be reduced and preferably omitted without reducing the safeguards against the development of bacterial and other contamination, e.g. fungal growth, that are detrimental to health. This need to reduce additives while preserving and preferably enhancing resistance against contaminations and infestations, exists or is encountered not only in the pharmaceutical field but also in medical fields such as, doctors and dental offices, hospitals and laboratories, and in food and food servicing, use of medical devices, healthcare, water purification and other areas involving product processing that affect health and which use equipment that require a power supply. In these industries there is a present widespread and increasing use of electrical equipment that utilizes power cords that contact or are in proximity to products which have a tendency to corrode the wire or attract or provide a formative environment for the growth of a variety of micro-organisms such as, fungus or other germs that are a detrimental source of contamination. Accordingly, the provision of cable insulation or covering jacket for the electric conductor that possesses the property of effectively suppressing and resisting contamination from a variety of germ laden or germ generating environments, affords substantial health benefits and minimizes the otherwise necessary need for introducing preservatives or additives intended to resist infestation of the object or product being processed.

SUMMARY OF THE INVENTION

The invention provides multiple conductor electrical wire and cable with an insulating sheathing having contaminant resistant properties as well as, possessing resistance to attack from a variety of biological destructive sources such as, fungal growth and microbial attack. Copper, aluminum or copper clad stainless steel wire is insulated with a suitable thermoplastic composition, preferably a PVC compound, that contains an insecticide or agent that inhibit microbial and other deteriorating biological growth. The plastic coated or jacketed wire or cable product is utilized for powering of appliances or electrical products within consumer or commercial applications especially those applications requiring the maintenance of sanitary and/or sterile environments.

DETAILED DESCRIPTION OF THE INVENTION

Figure 1A:
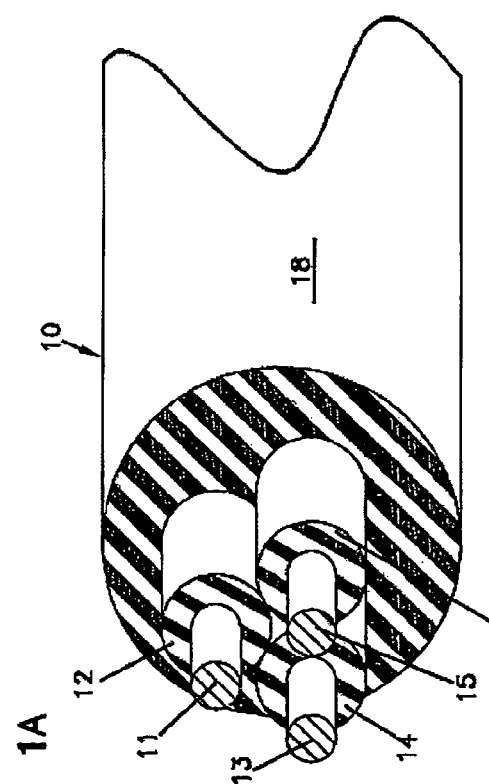
FIG. 1A is a perspective illustration of one form of the multiple conductor contaminant resistant jacketed electric wire cord or cable of the invention in the form of three conductor round configurations.

According to the invention, at least an outer insulating layer of the electrical wire or cable includes at least one anti-contaminating agent, e.g. an anti-microbial or anti-fungal agent dispersed and suspended in the coating of the thermoplastic polymer or matrix. The term "biologically resistant" or alternative "anti-contaminating" as used herein is intended to include, but is not limited to, anti-microbial agents, anti-fungal agents, anti-viral agents, anti-thrombotic agents, insecticidal agents and the like. The thermoplastic composition incorporating the anti-contaminating agent may also include compatible physical property modifying ingredients such as, plasticizers, stabilizers, flame retardants, fillers, friction reducing agents, radiopaque agents, and the like.

The selection of thermoplastic insulating composition and the thickness of the insulating layer(s) are evaluating factors of the finished conductor wire or cable.

As used herein, the term "microorganism" includes terms such as, bacteria, molds, yeasts, fungi, algae and viruses. "Antimicrobial" and "micro-biocidal" describe the killing of, as well as, the inhibition of the growth of bacteria, yeasts, fungi, algae and molds. "Bactericidal" describes the killing or inhibition of the growth of bacteria. "Fungicidal" describes the killing of, as well as, the inhibition of the growth of fungi, yeasts and molds. A preferred antimicrobial agent includes blends of isothiazolone, 4,5-dichloro-2 octyl 1,10,10 BIS (phenoxyl/arsinyl) oxide, available from Rohm and Haas under the brand name Vinyzene™.

The term "thermoplastic" used herein, includes the relatively flexible composition as distinguished from the relative rigid thermosetting plastic materials. Examples of thermoplastic materials include, but are not limited to, polyolefins (such as polyethylenes, polypropylenes, polybutylenes) polystyrenes, vinyl, polymeric vinyl, chlorides and nylons. The term "molding" is intended to include known suitable techniques such as, extrusion, for applying or depositing the plastic insulating layers. Molding is generally, but not always, accomplished with elevated temperature and includes, but is not limited to, forming methods such as, extruding, sheeting, calendaring and the like.

The term "plasticizers" includes any suitable comparable substance that mixes with and forms a homogeneous composition of the invention such as, the common moderately high molecular weight liquids and low melting solids including esters of carboxylic acids or phosphoric acid such as, trioctyl trimellitate, diisononyl phthalate, dinonyl phthalate, 1,2-benzenedicarboxylic acid/diundecyl phthalate and the like.

Flame retardant agents are the known compatible additives which when added or incorporated chemicals into the thermoplastic polymer serve to slow or hinder ignition or propagation of fire. Suitable flame retardant agents include phosphate esters, halogenated phosphoric esters, chlorinated and or bromated hydrocarbons, autonym trioxide, polyols containing phosphorus, bromated bisphenols and others.

Suitable known thermal stabilizers compatible with the thermoplastics such as calcium and/or zinc as well as, suitable known compatible fillers such as, calcium carbonate or calcined clay may also be incorporated.

In addition to the preferred Vinyzene™ agents referenced above, a variety of anti-microbial agents may be added to the polymer resin such as, zinc ion producing agents and copper ion producing agents. The anti-microbial agents may be included in carriers such as zeolite, hydroxyl apatite, silica gel, glass, magnesium, aluminate silicate, and partially soluble phosphates and the like.

Anti-fungal agents include the anti-microbial agents of the kind referenced above as well as, zinc oxide, zinc benzoate, zinc sulfate, and zinc borate. Friction reducing agents include polytetraflouroethylene (PTFR), FEP, and radiopaque agents include metallic tungsten, metallic barium and metallic gold.

According to the invention, the anti-contaminating additive, i.e. micro-organism growth resistant agent or agents are suspended in the thermoplastic matrix, and remain in powder or pellet form. The anti-contaminating agents have particulate size (diameter) of the order of up to 0.10 inches, and more preferably up to about 0.05 inches. The amount of additive added to the polymer resin may constitute up to about ten percent by weight of the solid thermoplastic material. Preferably the amount of additive constitutes below about two percent by weight of the thermoplastic on the finished article. While the individual thermoplastic matrix layers may be formed in any suitable thickness depending upon the particular requirement or intended use, it is preferable that the thickness of the matrix sublayers be between 0.01 to about 0.25 inches. Preferably, the thickness of the thermoplastic jacket is between about 0.020 inches to about 0.10 inches.

While the contaminant resistant agents in the insulating thermoplastic may be added homogenously throughout several layers of the thermoplastic jacket matrix structure, the contaminant resistant or combating agents including such ingredients such as, anti-microbial agents, the anti-fungal agents and the friction reducing agents may be added solely to the outer surface layer of a matrix exposed to the environment.

While various thermoplastic polymers, as referenced above, are suitable for use in forming the contaminant protective jacket, chloride polymers are the preferred thermoplastics. Polyvinyl chloride is produced in large quantities and is a widely used and suitable synthetic resin that is applied for use not only for wire insulating but is used in the manufacture of hose, sheet, bottles, construction materials, pipes and many other end uses due to its modest cost, excellent workability and for affording selectability over a broad range of hard to soft properties.

Polyvinyl chloride is preferred also because it possesses, inherently among other attributes, the germicide chlorine, and exhibits good flame resistance. Also the hydrogen chloride produced by combustion of polyvinyl chloride consumes oxygen which otherwise would provide flammability, thereby contributing to the flame resistance of polyvinyl chloride.

The invention is primarily concerned with wire or cable having at least two conductive electrical wires (core) and having a sheathing on said core comprising at least one thermoplastic polymer layer which contains the anti-microbial properties. When the jacket or sheathing comprises at least two layers, a first insulating layer surrounding the conductor and a second layer incorporating the first layer, at least the second layer comprises the thermoplastic polymer contains the anti-microbial properties. The invention thus comprises making an electrical power cable or cord by: providing a conductor wire or cable containing at least two electrical conductive (cores) wires or cable; and forming thereon an insulating thermoplastic polymer sheath or layer. When the matrix comprises only a single thermoplastic layer on the conductor, the single layer contains the contaminant resistant agent. When the multiple conductor is provided with a second or multiple thermoplastic resin layers i.e., an overlay, on said first layer, the second or in any case, the outer layer or sheathing contains the biological growth resistant agent.

The anti-contaminant thermoplastic composition to be used to form the insulating jacket layer(s) for the power cord is preferably prepared in pellet or powder form which, when it is applied to the conductor wire, is treated to a proper flow temperature and extruded by a procedure well know in the art for extruding insulation on electrical wiring.

In the manufacture of the power cord of the invention, the anti-contaminate thermoplastic formulations are prepared by combining the anti-contaminating agent and polymer within a high intensity mixer, where the mixture is blended to an approximate temp of 210 F. Material in a powder form is discharged and cooled prior to being conveyed to an extruder for pelletizing. This process creates a homogenous mixture and converts the powder into a uniform melt, and cooled to generate a pellet of approx 0.10" in diameter.

In preparing the insulation of the flexible multi-conductor core, the pelletized product containing the anti-contaminating agent is conveyed to an extrusion line where the core enters the extrusion crosshead for application of the extrudate. The extrudate is the homogenous melt that results from the exposure of the pellet, as produced within the previous process, to elevated temperature and pressure. This melt is the result of the material being conveyed through the confined conduit formed by the screw, its flights, and the inner surface of the barrel of the extruder.

Upon exiting the extrusion crosshead, the resulting product enters a chilled water cooling trough to accelerate the cooling and solidification process of the thermoplastic. The multiple conductor products illustrated in the drawing are representative of the forms of the resultant product.

The multiple conductor flexible cords and cables are prepared in accordance with Underwriter Laboratories (U.S.) Standard UL 62 while communication cables adhere to UL 444 the standards of which are incorporated herein by reference. Additionally, the multiple conductor products of the invention qualify under the U.S. standard for testing susceptibility to fungus of MIL-STD-810 incorporated herein.

The invention will be more fully described by reference to the FIGURES of the drawings.

Figure 1B:
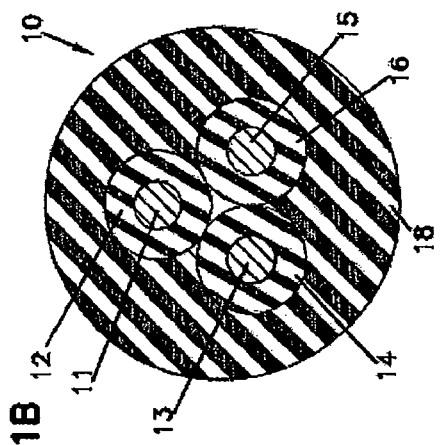
FIG. 1B is a cross sectional view of the embodiment illustrated in FIG. 1A.

Referring to FIGS 1A and 1B, a round cable 10 comprised of three conducting cores 11, 13 and 15 each of which is sheathed in a first thermoplastic resinous composition layer 12, 14 and 16, respectively. The twisted trio is then jacketed in an outer layer 18 which contains the contaminant resisting agent. The cable 10 of the type shown in FIG. 1A finds primary utility applications that require multiple conductor power supply cords for a wide variety of applications such as, food service equipment, appliances, fluid handling equipment, medical equipment, etc.

Figure 2A:
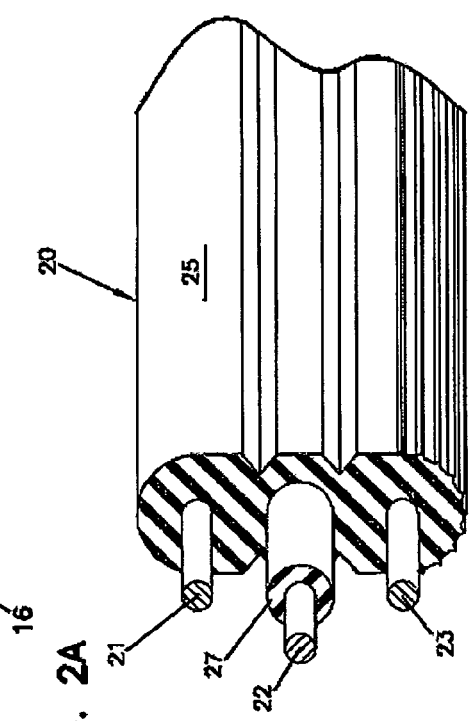
FIG. 2A is a perspective view of an alternative electric wire or cable with an anti-microbial and anti-fungal jacket in the form of a flat configuration which the three conductors are linearly aligned.
Figure 2B:
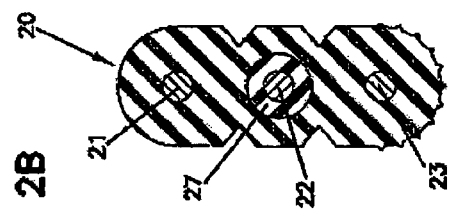
FIG. 2B is a cross sectional view of the embodiment illustrated in FIG. 2A.

Referring to the alternative embodiment of FIGS. 2A and 2B a flat configuration 20 which is preferred for use in such applications as low profile power supply cords is illustrated. As shown, this flat configuration comprises of multiple conductors in parallel, with conductors 21, 22 and 23 aligned linearly with the central core 22 only sheathed in a first layer 27. The entire alignment is then jacketed in the thermoplastic layer 25 that contains the biological growth resisting agent. The configuration of the type shown in FIG. 2A find primary utility in application environments such as, power supply cords for food service equipment, fluid handling, medical treatment equipment, in doctor's offices, hospitals and the like.

The central conductor 22 in this embodiment may be pre-coated or insulated 27 prior to the encapsulation in the outer jacket.

Although the present invention has been described in terms of specific embodiments, the invention is not meant to be so limited. Various changes can be made to the composition and proportions used while still obtaining the benefits of the invention. For example, while the invention has been described primarily with reference to metal core electrical conductor, it will be apparent that the core may also be comprised of fiber optics.

What is claimed is:

1. A unitary multiple conductor electrical cable comprising:
   at least two conductors; and
   at least one continuous outer thermoplastic layer surrounding the at least two conductors;
   wherein the at least one continuous outer thermoplastic layer comprises an anti-microbial agent and a thermoplastic polymer selected from the group consisting of a vinyl chloride polymer, a polystyrene polymer, a nylon polymer, and a combination thereof; and
   wherein the unitary multiple conductor electric cable is an electrical power cord.

2. The cable of claim 1, wherein the at least two conductors comprise copper, aluminum, copper clad stainless steel, or a combination thereof.

3. The cable of claim 2, wherein the at least two conductors comprise copper.

4. The cable of claim 1, wherein the thermoplastic polymer is a vinyl chloride polymer.

5. The cable of claim 1, wherein the cable comprises at least one continuous inner thermoplastic layer surrounding at least one of the at least two conductors, wherein the at least one continuous outer thermoplastic layer surrounds the at least one continuous inner thermoplastic layer, and the at least one continuous outer thermoplastic layer comprises the anti-microbial agent.

6. The cable of claim 5, wherein the at least one continuous inner thermoplastic layer has a thickness in a range from about 0.01 to about 0.25 inches.

7. The cable of claim 1, wherein the anti-microbial agent comprises a blend of isothiozolone, 4, 5-dichloro-2 octyl 1, 10, 10 bis(phenoxy/arsinyl) oxide.

8. The cable of claim 1, wherein the at least one continuous outer thermoplastic layer further comprises a plasticizer, a flame retardant agent, a thermal stabilizer, an anti-fungal agent, a friction reducing agent, a radiopaque agent, or any combination thereof.

9. The cable of claim 1, wherein the anti-microbial agent is present in the at least one continuous outer thermoplastic layer at less than about 10 weight percent.

10. The cable of claim 1, wherein the at least one continuous outer thermoplastic layer is in direct contact with at least one of the at least two conductors.

11. The cable of claim 5, wherein the at least one continuous outer thermoplastic layer is affixed to the at least one continuous inner thermoplastic layer.

12. The cable of claim 1, wherein:
   the at least two conductors comprise copper, aluminum, copper clad stainless steel, or a combination thereof;
   the thermoplastic polymer is a vinyl chloride polymer; and
   the anti-microbial agent is present in the at least one continuous outer thermoplastic layer at less than about 10 weight percent.

13. A method of producing a multiple conductor electrical cable comprising an anti-microbial agent, the method comprising:
   providing at least two conductors; and
   extruding at least one continuous outer thermoplastic layer around the at least two conductors;
   wherein the at least one continuous outer thermoplastic layer comprises the anti-microbial agent and a thermoplastic polymer selected from the group consisting of a vinyl chloride polymer, a polystyrene polymer, a nylon polymer, and a combination thereof; and
   wherein the multiple conductor electric cable is an electrical power cord.

14. The method of claim 13, wherein the anti-microbial agent is combined with the thermoplastic polymer at a temperature of at least 200° F. to form thermoplastic pellets comprising the anti-microbial agent, and the thermoplastic pellets comprising the anti-microbial agent are extruded around the at least two conductors to form the at least one continuous outer thermoplastic layer.

15. The method of claim 13, wherein:
   the at least two conductors comprise copper, aluminum, copper clad stainless steel, or a combination thereof;
   the thermoplastic polymer is a vinyl chloride polymer; and
   the anti-microbial agent is present in the at least one continuous outer thermoplastic layer at less than about 10 weight percent.

16. A unitary multiple conductor electrical cable comprising:
   at least two conductors;
   at least one continuous inner thermoplastic layer surrounding each of the at least two conductors; and
   at least one continuous outer thermoplastic layer surrounding the at least one continuous inner thermoplastic layer;
   wherein the at least one continuous outer thermoplastic layer comprises an anti-microbial agent and a thermoplastic polymer selected from the group consisting of a vinyl chloride polymer, a polystyrene polymer, a nylon polymer, and a combination thereof; and
   wherein the unitary multiple conductor electric cable is an electrical power cord.

17. The cable of claim 16, wherein the at least one continuous outer thermoplastic layer is affixed to the at least one continuous inner thermoplastic layer.

18. The cable of claim 16, wherein:
the at least two conductors comprise copper, aluminum, copper clad stainless steel, or a combination thereof;
the thermoplastic polymer is a vinyl chloride polymer; and
the anti-microbial agent is present in the at least one continuous outer thermoplastic layer at less than about 10 weight percent.

* * * * *